United States Patent
Szacherski

(10) Patent No.: US 9,665,180 B2
(45) Date of Patent: May 30, 2017

(54) METHOD FOR CONTINUOUS RECOGNITION OF GESTURES OF A USER OF A HANDHELD MOBILE TERMINAL FITTED WITH A MOTION SENSOR ASSEMBLY, AND RELATED DEVICE

(71) Applicant: MOVEA, Grenoble (FR)

(72) Inventor: Pascal Szacherski, Saint-Laurent-du-Pont (FR)

(73) Assignee: Movea, Grenoble (FR)

( * ) Notice: Subject to any disclaimer, the term of this patent is extended or adjusted under 35 U.S.C. 154(b) by 0 days.

(21) Appl. No.: 14/557,593

(22) Filed: Dec. 2, 2014

(65) Prior Publication Data

US 2015/0177845 A1 Jun. 25, 2015

(30) Foreign Application Priority Data

Dec. 3, 2013 (FR) ..................................... 13 62010

(51) Int. Cl.
*G06F 3/01* (2006.01)
*G06F 3/0346* (2013.01)

(52) U.S. Cl.
CPC ............ *G06F 3/017* (2013.01); *G06F 3/0346* (2013.01); *G06F 2200/1637* (2013.01)

(58) Field of Classification Search
CPC ....... G06F 1/3262; G06F 3/017; G06F 3/0346
USPC ......................................... 345/156, 170–176
See application file for complete search history.

(56) References Cited

U.S. PATENT DOCUMENTS

| | | | |
|---|---|---|---|
| 2010/0104134 A1* | 4/2010 | Wang et al. | 382/103 |
| 2011/0191675 A1* | 8/2011 | Kauranen | 715/702 |
| 2012/0016641 A1 | 1/2012 | Raffa et al. | |
| 2012/0062604 A1* | 3/2012 | Lobo et al. | 345/684 |
| 2012/0127070 A1* | 5/2012 | Ryoo et al. | 345/156 |
| 2012/0313847 A1* | 12/2012 | Boda et al. | 345/156 |
| 2014/0168057 A1* | 6/2014 | Ahuja et al. | 345/156 |
| 2014/0357189 A1* | 12/2014 | Thuroe | 455/41.1 |

OTHER PUBLICATIONS http://www.hobbytronics.co.uk/accelerometer-gyro.*
Search Report and Written Opinion from French Patent Application No. 1362010, mailed on Oct. 9, 2014.
Manthey, Thomas, 2010, "Android Cookbook. using the accelerometer to detect shaking of the device" http://androidcookbook.com/Receipt.seam?receipeld=529.
Wu, Jiahui et al., 2009, "Gesture Recognition with 1-17 a 3-D Accelerometer", in "Field Programmable Logic and Application", Springer Berlin Heidelberg, Berlin, Heidelberg, XP055142497.

* cited by examiner

*Primary Examiner* — Tony Davis
(74) *Attorney, Agent, or Firm* — Stroock & Stroock & Lavan LLP

(57) ABSTRACT

A method for the continuous recognition of gestures of a user of a handheld mobile terminal fitted with a motion sensor assembly, includes the steps of, for at least one motion sensor measuring signal of the motion sensor assembly, over a time window:
  detecting (2) a candidate gesture; and
  comparing (3) said candidate gesture with a set of predetermined gestures.
The candidate gesture detection step (2) includes substeps of:
  calculating the value of a parameter representative of the symmetry of the gesture with respect to at least one axis; and
  calculating the value of a parameter representative of the energy of the gesture along at least one axis.

17 Claims, 4 Drawing Sheets

METHOD FOR CONTINUOUS RECOGNITION OF GESTURES OF A USER OF A HANDHELD MOBILE TERMINAL FITTED WITH A MOTION SENSOR ASSEMBLY, AND RELATED DEVICE

CROSS-REFERENCE TO RELATED APPLICATIONS

This application claims the benefit of French Application No. 1362010, filed Dec. 3, 2013, the contents of which are incorporated herein by reference

FIELD OF THE INVENTION

Various embodiments of the invention relate to a method for continuous recognition of gestures of a user of a handheld mobile terminal fitted with a motion sensor assembly, and a related device.

In other words, preferred embodiments of the invention can be used to recognize a gesture without a user having to indicate, e.g. by means of a triggering button, that a gesture recognition mode has to be activated.

BACKGROUND OF THE INVENTION

Recently, integrating gesture recognition has become known, triggered, for example, in remote control devices of digital television sets. The user has a control element for controlling a system by performing a triggered gesture, i.e. the user must perform a gesture while pressing a button on the remote control.

However, especially for touch screen mobile terminals of the touch tablet or phablet types, the fact of having to press a button to trigger gesture recognition is particularly inconvenient, unlike a conventional remote control. In view of the size of tablets, most of the time the user holds the tablet in both hands and it would be more intuitive and ergonomic to indicate a gesture by moving the tablet with the hands.

Moreover, most touch tablets do not have buttons that can easily and ergonomically be used as triggering buttons for gesture recognition.

The recognition of non-triggered, or online gestures for mobile devices has already given rise to publications, such as "Online gesture recognition for user interface on accelerometer built-in mobile phones," by B. W. Choe, J. K. Min and S. B. Cho, Neural Information Processing. Models and Applications, pp. 650-657, 2010. Here it is disclosed that all new gestures made on a mobile phone are compared with a database using a method of comparing time-warped signals, such as DTW (Dynamic Time Warping) derived from the field of digital signal processing. For reducing the processing time required, a method of optimization is provided for the DTW method, in which the gestures in the database are grouped together and averaged.

SUMMARY OF THE INVENTION

One object of the invention is to be able to control a touch screen mobile terminal using gestures, without pressing a triggering button.

Also, according to one aspect of the invention, a method is provided for the continuous recognition of gestures of a user of a handheld mobile terminal fitted with a motion sensor assembly, including the steps of, for at least one motion sensor measuring signal of the motion sensor assembly, over a time window:

detecting a candidate gesture; and
comparing said candidate gesture with a set of predetermined gestures, e.g. using a gesture database;
said candidate gesture detection step including the substeps of:
calculating the value of a parameter representative of the symmetry of the gesture with respect to at least one axis; and
calculating the value of a parameter representative of the energy of the gesture along at least one axis.

Such a method can be used to control a system from a mobile terminal such as a remote control, a smartphone or a touch tablet using gestures.

The detection of candidate gestures may be regarded as a preselection in order to reduce the number of gestures which are compared with the gesture database, since the latter process consumes a great deal of computing power.

The motion sensor assembly is broadly understood as being one or more inertial sensors, or one or more cameras.

The database may be generated theoretically ('real' sinusoids), collectedly (with a passage of a number of users and associated processing), or compared using functions.

According to one implementation, said parameter representative of the symmetry of the gesture with respect to at least one axis depends on the integral of said signal.

Alternatively, said parameter representative of the symmetry of the gesture with respect to at least one axis may depend on the average of said signal (moment of order 1).

When a user performs a gesture, the tablet is reset to its initial position. This means that the movement is symmetrical, and an easy means of verifying this symmetry is to calculate the average or the integral, which ideally is close to zero.

In one implementation, said parameter representative of the energy of the gesture along at least one axis depends on the variance of said signal (moment of order 2).

When the user holds the tablet in his/her hands, there is always movement. Small variations may also be symmetrical, therefore in order not to see this as a gesture, the movement needs to have some energy.

According to one implementation, said candidate gesture detection step further includes a substep of testing if the value of the parameter representative of the symmetry of the gesture with respect to at least one axis is less than or equal to a first threshold and if the value of the parameter representative of the energy of the gesture along said axis is greater than or equal to a second threshold.

A candidate gesture is ideally symmetrical and have enough energy or amplitude.

In one implementation, said candidate gesture detection step further includes a substep of testing if the value of a third parameter representative of the dominant frequency of the signal along said axis is less than or equal to a third threshold.

Thus, it is possible to eliminate tremors and high-frequency oscillations.

Said time window may be a sliding window.

Thus, it is possible to calculate the parameters for a fixed number of samples, continuously.

According to one implementation, the method further includes a step of counting the number of successive time samples for which, over the corresponding time window, a candidate gesture is detected, and a step of comparing a detected candidate gesture with a set of predetermined gestures when said number of successive time samples reaches a predetermined number.

By requiring the detection of a certain number of successive candidate gestures, the system is more robust and has fewer false positives derived from accidental manipulations.

The method may also include a step of automatic adaptation of at least one of said thresholds to the user, e.g. by means of a step of modifying one of said thresholds when for a detected candidate gesture, the corresponding parameter has a value not within a range of percentage values of said corresponding threshold.

This increases the performance for the user and enables the number of false positives and false negatives to be reduced.

According to one implementation, the method includes a step of automatic adaptation of the size of the time window to the durations of gestures in the set of predetermined gestures or to the durations of the user's gestures.

In one implementation, at least one of said thresholds depends on the orientation of the mobile terminal.

This can be used to eliminate false positives when the user is walking along with the tablet under his/her arm.

According to one implementation, said axis is a measurement axis of said sensor.

In one implementation, said substep of calculating the value of a parameter representative of the energy of the gesture along at least one axis is performed when said substep of calculating the value of a parameter representative of the symmetry of the gesture with respect to said axis indicates a symmetry.

As a candidate gesture ideally satisfies both a condition of symmetry and energy, if the gesture is not symmetrical, there is no need to calculate the energy.

Said thresholds may depend on the axis.

According to another aspect of the invention, a device is also provided for continuous recognition of gestures of a user of a handheld mobile terminal fitted with a motion sensor assembly, including modules suitable for implementing the method as previously described.

According to another aspect of the invention, a handheld mobile terminal fitted with a device as described above is also provided.

BRIEF DESCRIPTION OF THE DRAWINGS

The invention will be better understood from the study of some embodiments described by way of non-restrictive examples and illustrated by the accompanying drawings in which.

DETAILED DESCRIPTION

In all the figures, elements having the same references are similar. In the rest of the description the example of mobile terminal described is a tablet, without, however, limiting the scope of the invention to this example. Indeed, the mobile terminal may, for example, be a television remote control or a mobile phone.

Generally, a tablet is taken in both hands by the user thereof, and the latter cannot then press a dedicated triggering button to tell the system that the user is performing a gesture, or it is very difficult to do so. This means that the system is preferably able to determine whether or not the user is performing a gesture from the tablet's movements.

In order to be able to identify an unequivocal gesture, it is preferable to take an orthogonal set of gestures.

If two gestures G1 and G2 are considered, without loss of generality, G2 is the smaller gesture (the shorter in duration). Gestures G1 and G2 are defined as orthogonal if G2 is not a part of G1, i.e. if G1 is a succession of several basic gestures, G2 is not one of them.

A set of gestures is said to be orthogonal if all the gestures of this set are orthogonal with respect to the other gestures.

Figure 1:
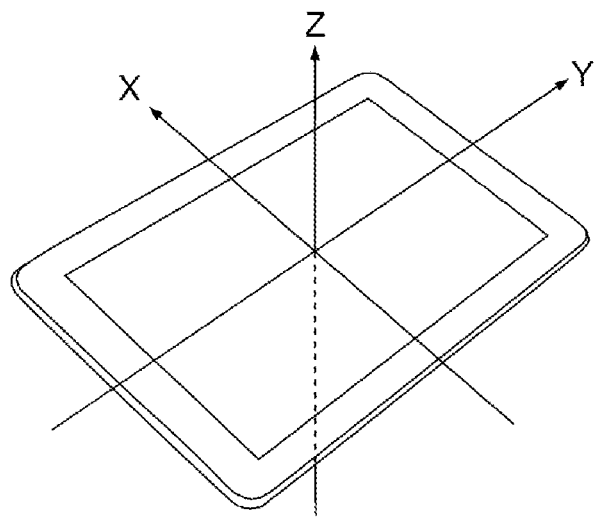
FIG. 1 schematically illustrates the axes of a tablet.

The simplest way to construct a set of gestures that is orthogonal consists in limiting the gestures to the tablet axes. FIG. 1 represents the three X-, Y- and Z-axes of a tablet. Thus, rotational gestures are taken about each of these axes, and translational gestures along each of these axes. As it is possible to distinguish the direction of the rotations and translations, it is possible to have two rotational gestures per axis and two translational gestures per axis.

Figure 2:
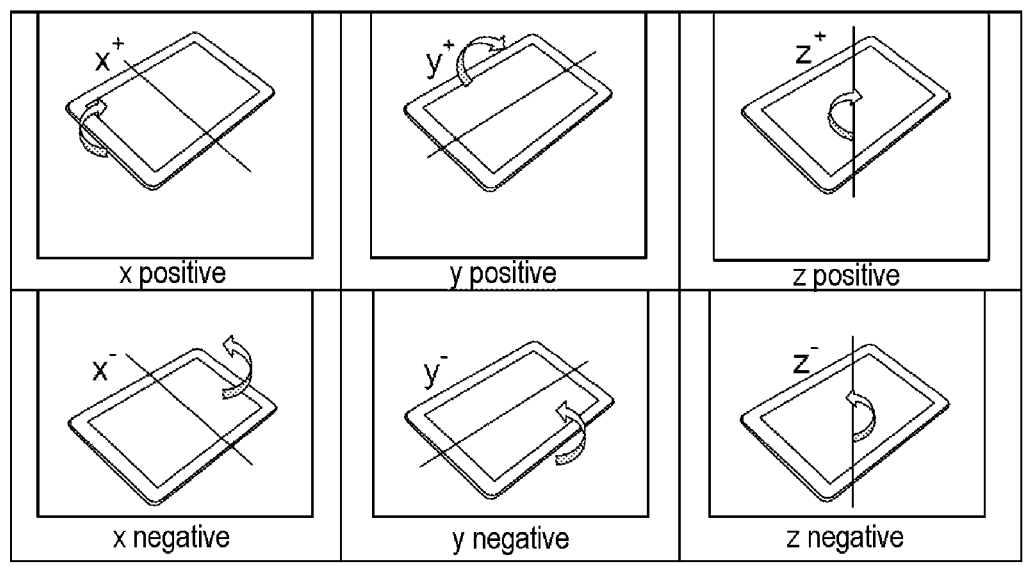
FIG. 2 schematically illustrates the six possible rotations about the X, Y and Z axes, according to one aspect of the invention, FIG. 3 schematically illustrates the six possible translations about the X, Y and Z axes, according to one aspect of the invention, FIG. 4 schematically illustrates a method according to one aspect of the invention.
Figure 3:
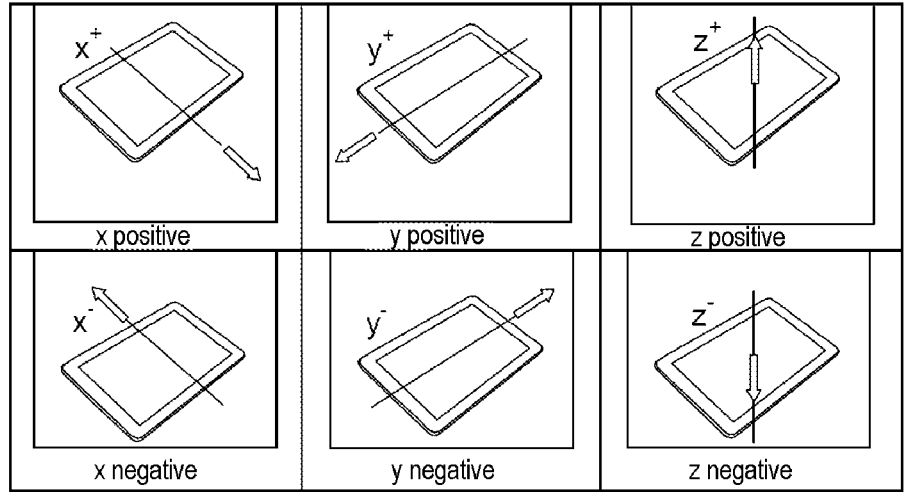

Accordingly, six rotations are identified, as illustrated in FIG. 2:
one positive rotation about the X-axis of the tablet,
one negative rotation about the X-axis of the tablet,
one positive rotation about the Y-axis of the tablet,
one negative rotation about the Y-axis of the tablet,
one positive rotation about the Z-axis of the tablet, and
one negative rotation about the Z-axis of the tablet;
and six translations, as illustrated in FIG. 3:
one positive translation about the X-axis of the tablet,
one negative translation about the X-axis of the tablet,
one positive translation about the Y-axis of the tablet,
one negative translation about the Y-axis of the tablet,
one positive translation about the Z-axis of the tablet, and
one negative translation about the Z-axis of the tablet.

After each of the previously mentioned movements, the user brings the tablet into its initial position. This means that a positive rotation about an axis of the tablet is followed by a reverse negative rotation. This means that the complete gesture includes the initial positive rotation and the final negative rotation.

In 'normal' use, the user's hands are on the short edges of the tablet, marking the Y-axis.

For performing a positive rotational gesture along the X-axis, the user can begin by moving his/her right hand down or his/her left hand up (the tablet is assumed to be horizontal), then finish respectively by moving his/her right hand up or his/her left hand down, so that the tablet is brought back to its initial position.

Figure 4:
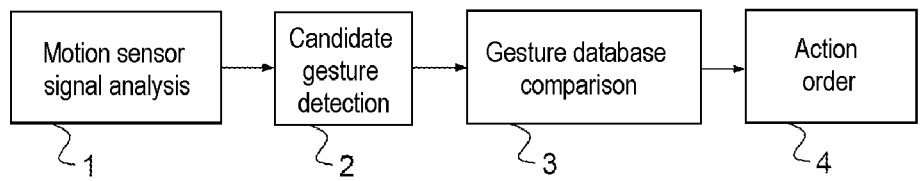

FIG. 4 schematically illustrates the method according to an embodiment of the invention. As the user does not use triggering buttons for defining the start and end of a gesture, the signals from the motion sensors are preferably analyzed continuously for detecting gestures performed by the user.

This means that the device continuously analyzes 1 the signals supplied by a motion sensor assembly including at least one motion sensor, in a time window, in order to detect 2 a candidate gesture. When a candidate gesture is detected 2, it is compared 3 with a set of gestures in a gesture database, e.g. by means of a dynamic time normalization method or DTW, the acronym for Dynamic Time Warping. If a match between the candidate gesture and a gesture in the set is detected, then an action is executed 4, associated with the context of use and the gesture in the set.

In order to measure the movements of the mobile terminal, e.g. the tablet, the motion sensor assembly includes, preferably, a triaxial gyroscope and a triaxial accelerometer. The gyroscope, measuring angular rotational speeds, is ideal for detecting rotational gestures. The accelerometer, measuring linear acceleration, and perfect for detecting the translational gestures for which no rotation is applied to the tablet.

As a variant, the measurements provided by the accelerometer and the gyroscope may be merged by a data merging algorithm for determining the orientation and/or position of the tablet, and the gestures may then be deduced from the changes in the orientation and/or position of the tablet.

Figure 5A:
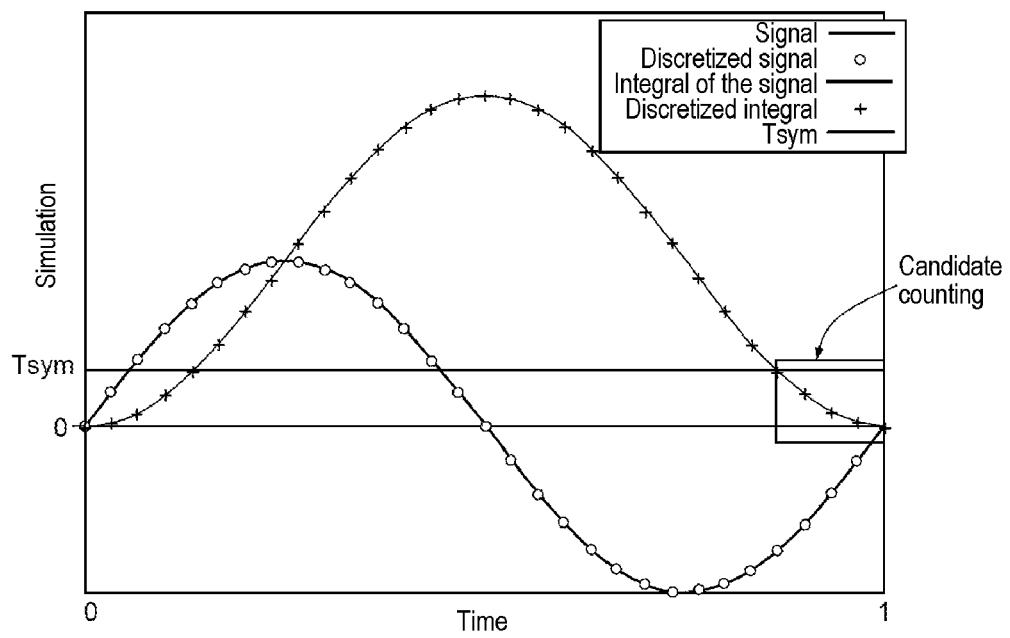
FIGS. 5a, 5b and 5c schematically illustrate examples of signals corresponding to one rotation, FIG. 6 schematically illustrates one implementation of a candidate gesture detection step, according to one aspect of the invention.

FIG. 5a represents an example of a simulation of signals supplied by a gyroscope during a rotational gesture along an axis of the gyroscope. It is considered that the user performs a perfectly symmetrical rotational gesture about an axis of the tablet which corresponds directly, or via a simple transformation, to an axis of the gyroscope.

Figure 5B:
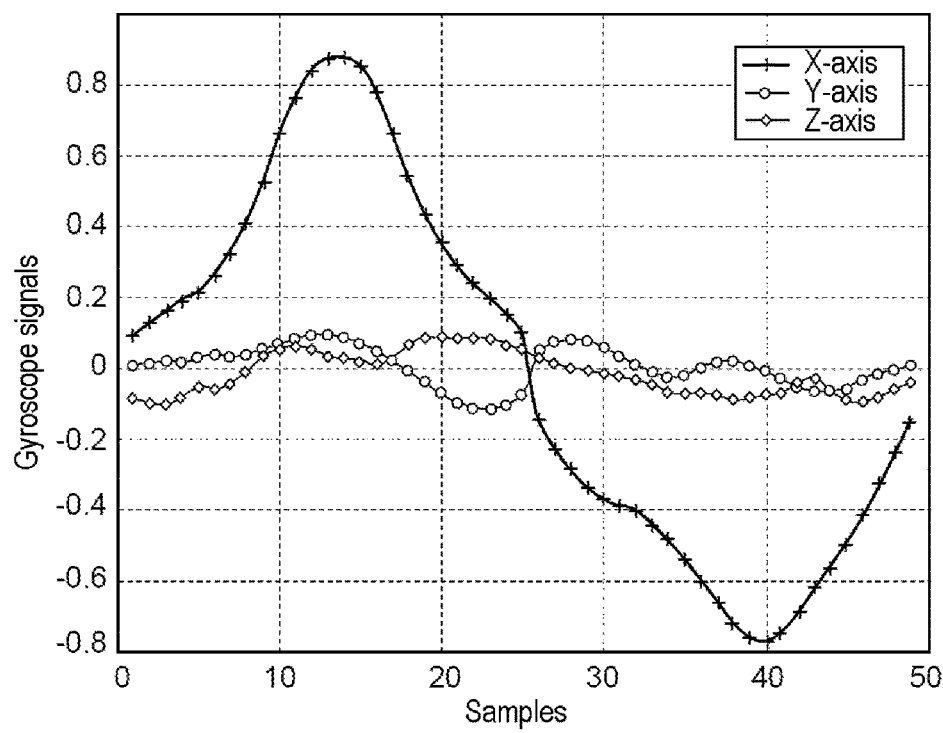

FIG. 5b represents an example of actual gyroscope signals along the three axes (100 Hz sampling) for the same type of gestures, as in FIG. 5a.

The gyroscope signal $S_G(t)$ then has a shape close to the following sinusoidal shape: $S_G(t) \sim \sin(2\pi t)$.

The time t is between 0 and 1, and represents the width of the time window, in this case a sliding window used for analyzing the gyroscope signal.

At the start of the movement, the angular rotational speed is positive and increases until it reaches a maximum. The user then slows down the rotation of the tablet until it reaches the maximum amplitude of the user's gesture (and zero rotational speed), before reversing the movement of same producing a negative angular rotational speed. At the end, the user slows down the rotation of the tablet to bring same back to its initial position.

Figure 5C:
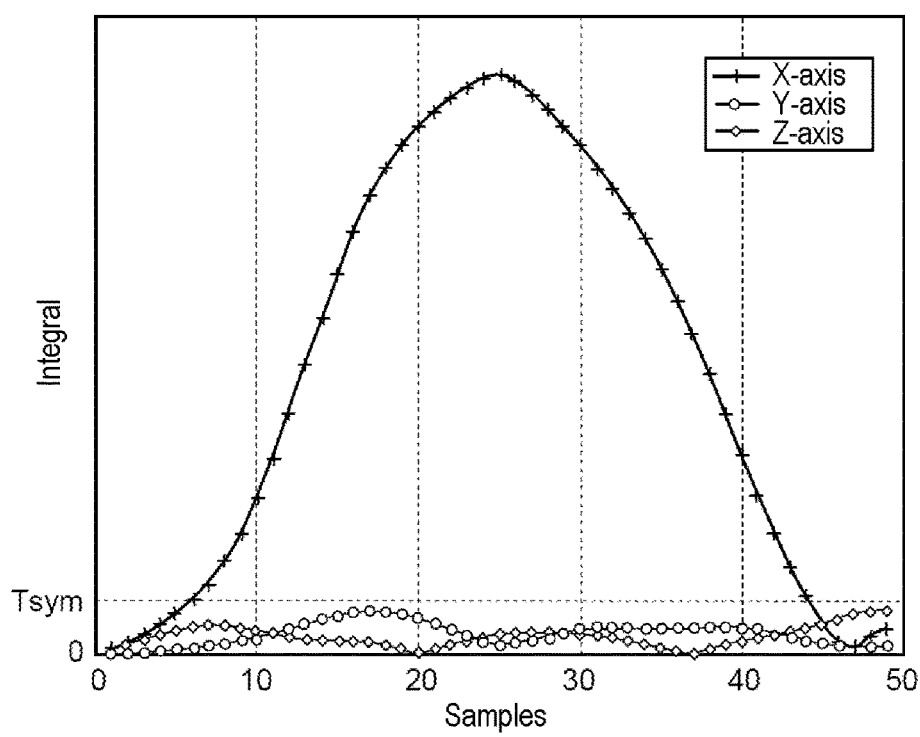

FIGS. 5a and 5c also show the integral of the gyroscope signal since the start of the gesture, respectively for the simulation and the actual signals. As the gesture is symmetrical and the user brings the tablet back to the initial position of same, the integral of the signal on the complete gesture is substantially equal to zero:

$$\int_0^1 S_G(t)\,dt = \int_0^1 \sin(2\pi t)\,dt = 0$$

From the above, it appears that for a gesture to be considered as a candidate gesture, it preferably is symmetrical. In order to measure the symmetry of the gesture it is possible to calculate the value of a parameter representative of the symmetry of the gesture with respect to at least one axis, e.g. to calculate the integral of the corresponding signal.

As a variant, the average of the signal may be calculated over the time window.

As a variant, the difference in the orientation and/or position of the tablet may be calculated between the start of the gesture and the end of the gesture. In a symmetrical gesture, this difference is not very large.

Thus, for the gesture to be considered as a candidate gesture, a norm of its integral should be less than or equal to first threshold $T_{sym}$ or symmetry threshold:

$$\left| \int_0^1 S_G(t) \right| \leq T_{sym}$$

As a variant, the average of the signal over the time window may be used as a parameter representative of the symmetry of the gesture. In this case, a norm of the average over the time window with N samples should be less than or equal to this first threshold $T_{sym}$ or symmetry threshold:

$$|\overline{S_G(t)}| = \left| \frac{1}{N} \sum_N S_G(n) \right| \leq T_{sym}$$

The norm may, for example, be the absolute value.

As the tablet can be moved independently along the three axes, in an improved implementation of the invention, this condition can be met on the three X, Y, Z axes simultaneously. However, the first threshold may have a different value according to the axis considered.

This symmetry condition alone is not sufficient for detecting a gesture, since in the absence of movement, the noise or parasitic signal may reach an integral or average below the first threshold.

A second condition is then taken into account for detecting a candidate gesture, taking into account the fact that the amplitude or energy of the gesture is ideally sufficiently large. The variance of the signal, the value whereof should be greater than or equal to a second threshold or energy threshold $T_{nrj}$, may be taken as a parameter representative of the energy:

$$\mathrm{Var}(S_G) = \frac{1}{N} \sum_N (S_G(n) - \overline{S_G})^2 \geq T_{nrj}$$

Like the first threshold $T_{sym}$, this second threshold $T_{nrj}$ may have a different value according to the axis considered.

When the user is walking along swinging the tablet in his/her hand, this may result in false detections of rotation about the Z-axis. For avoiding such a false detection, it is possible to increase the second threshold along the Z-axis $T_{nrj,Z}$ when the tablet is held in a substantially vertical orientation. This increase of the second threshold does not pose any problem when the user holds the tablet vertically, e.g. like a steering wheel, since in this position, the rotations about the Z-axis are very ergonomic and therefore easy to implement with sufficient energy to exceed the second threshold by making an intentional gesture. The orientation of the tablet may be determined by using the measurements supplied by the accelerometers.

For example, if the average of the $N_{acc}$ last samples of the accelerometer measurements on the X- or Y-axis are close to an acceleration of 1 g (g corresponding to the acceleration of gravity at the Earth's surface, approximately 9.81 m·s$^{-2}$), e.g. greater than or equal to 0.85 g, the user holds the tablet substantially vertically and therefore the second threshold $T_{nrj,Z}$ along the Z-axis is increased.

In the implementation previously described, it was required for the integral or the average to be close to zero on the three axes, and for the variance to be higher than a threshold along at least one axis. These requirements are very strict, which means that the user should perform the gestures correctly (as in the database) along one particular axis, without much movement along the other axes.

Other less strict embodiments may also be envisaged. For example, if only gestures along the X- and Y-axes are involved, the user may be allowed to perform additional movements along the Z-axis, which will be ignored in the gesture detection procedure. In any case, all the candidate gestures for which the user brings back the tablet to its initial position at the end of the gesture, no matter how many axes are concerned, have an integral or average close to zero along these axes and a variance greater than or equal to the second threshold $T_{nrj}$.

In addition to the two major conditions, it is possible to add another condition for preventing strong oscillation signals, such as tremors or high-frequency oscillations being recognized as candidate gestures. In this case, a parameter representative of the dominant frequency may be used e.g. on the dominant axis of rotation obtained from a Fourier transform. For example, a dominant frequency may be imposed, e.g. on the dominant axis of rotation, below a third threshold or frequency threshold $T_{freq}$, e.g. $T_{freq}=8$ Hz.

Figure 6:
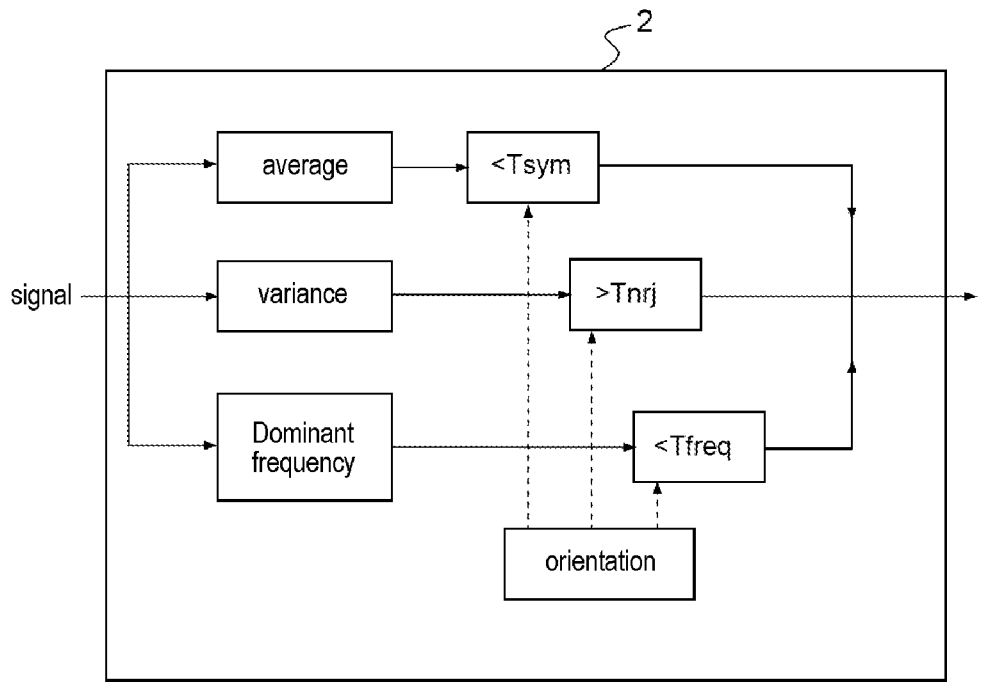

FIG. 6 presents an overview of the various conditions for detecting a candidate gesture. The conditions are checked for each sliding window, i.e. each time that a new measurement sample is obtained from the motion sensors.

If all the conditions mentioned above are met, the signal is considered a candidate gesture. FIG. 6 illustrates the case in which a candidate gesture is detected when the three conditions are met, but it is possible, as a variant, not to have the condition on the dominant frequency.

However, for increasing the robustness of the device and the method according to certain embodiments of the invention, several identical successive candidate gestures may be desirable in order to pass on to the next step and to compare the candidate gesture finally detected with the set of gestures in a gesture database, e.g. by using a DTW method.

Figure 7:
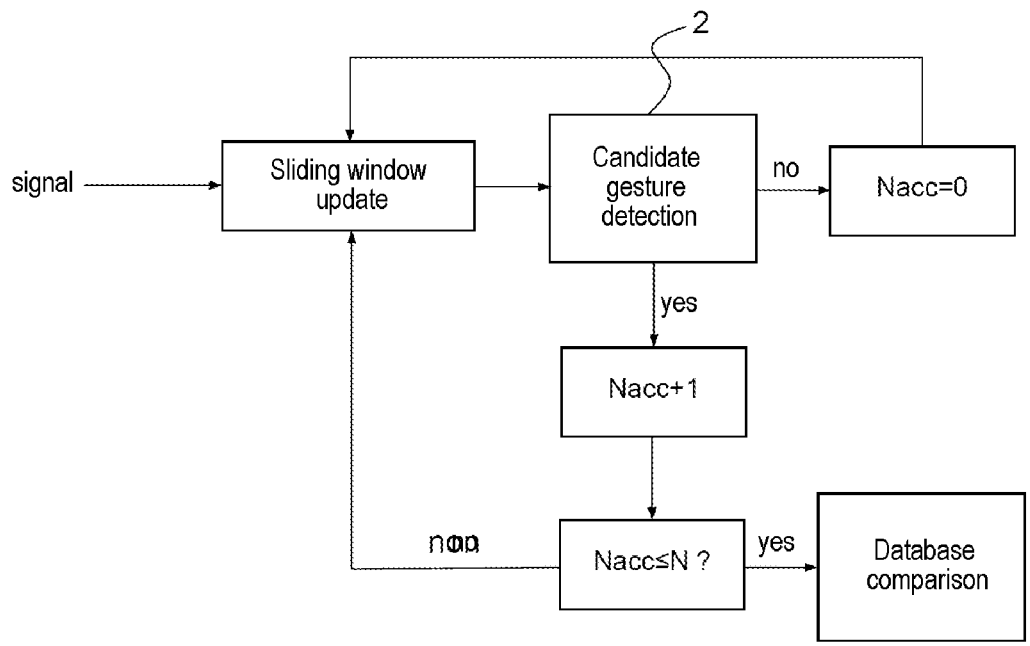
FIG. 7 schematically illustrates an example of counting successive candidate gestures.

FIG. 7 illustrates the counting of successive candidate gestures. Whenever the conditions are met for detecting a candidate gesture, a counter is incremented by one unit. On the other hand, when the conditions are not met the counter $N_{cand}$ is reset to zero. When the counter $N_{cand}$ reaches a predefined number N of identical successive candidate gestures, this current candidate gesture is compared with the set of gestures. This does not mean that the final decision is delayed by N samples after the end of the gesture.

As shown in FIG. 5c, the integral or average already falls below the first threshold $T_{sym}$ before the end of the gesture, which means that the condition $N_{cand}=N$ is satisfied toward the end of the gesture, adding almost no latency time between the end of performing the gesture and the comparison with the set of gestures.

As previously mentioned, the various thresholds may depend on the axis considered and the orientation of the tablet.

Furthermore, the thresholds can also be automatically adapted to the user.

The first condition will be considered in which the average or integral is ideally less than or equal to the first threshold $T_{sym}$. Ideally, the calculated average is approximately 50% of the respective first threshold $T_{sym}$ (along X, Y or Z). If the user makes a correct gesture for which the average is, for example, 90% of the respective first threshold $T_{sym}$, the condition is still met and the signal is accepted, but it is close to an incorrect rejection. For avoiding such incorrect rejections and having a larger margin, the first threshold $T_{sym}$ may be automatically increased after a certain number of such situations. Opposite situations occur when the user makes a correct gesture for which the average or integral is, for example, only 20% of the first threshold $T_{sym}$. If such is the case, several times in succession, it means that the user is making very correct and symmetrical gestures, and it is preferable to reduce the first threshold $T_{sym}$. If the first threshold $T_{sym}$ is too high with respect to the user's gestures, there is a risk of false detections, or a candidate gesture may be detected that is not actually a planned gesture, but, for example, just a tremor or a start.

The other thresholds may, of course, be adapted in a similar way to the user for maintaining the parameters corresponding to the thresholds in respective predetermined ranges. Other means of adapting the thresholds may also be implemented. If the user makes an undetected gesture, but he/she repeats this gesture to do things, the thresholds may also be adapted. If a gesture is regularly detected, but the user cancels the corresponding ordered action, the thresholds may also be adapted.

The size of the time window may be adapted (automatically). For example, the size of the window may be defined as comparable to the maximum duration of the gesture in the set of predetermined gestures. As a variant, the size of the time window may be comparable to the usual duration of the user's gestures. As previously with the adaptation of the thresholds, the size of the time window may be automatically adapted if the duration of one or more of the user's gestures is not included in a range of percentage values of the window size.

The steps in the method described above may be performed by one or more programmable processors executing a computer program for performing the functions of the embodiments of the invention by acting on input data and generating output data, in the device according to the invention.

A computer program may be written in any programming language, such as compiled or interpreted languages, and the computer program may be deployed in any form, including as a stand-alone program or as a subroutine or function, or any other form appropriate for use in a computer environment.

A computer program may be deployed for being executed on a computer or on multiple computers on a single site or on multiple sites distributed and interconnected therebetween via a communications network.

The invention claimed is:

1. A method for continuous recognition of gestures of a user of a handheld mobile device comprising a motion sensor assembly, the method including steps comprising, for at least one motion sensor measuring signal of the motion sensor assembly, over a time window:
   detecting a candidate gesture; and
   comparing said candidate gesture with a set of predetermined gestures;
   said candidate gesture detection step including substeps comprising:
      calculating a value of a parameter indicative of a symmetry of the candidate gesture with respect to at least one axis, indicating for the candidate gesture, the extent to which the handheld mobile device is returned to at least one of:
         an initial position, and
         an initial orientation; and
      calculating a value of a parameter indicative of an energy of the candidate gesture along at least one axis.

2. The method according to claim 1, wherein said parameter indicative of the symmetry of the candidate gesture with respect to at least one axis depends on an integral of said signal.

3. The method according to claim 1, wherein said parameter indicative of the symmetry of the candidate gesture with respect to at least one axis depends on an average of said signal.

4. The method according to claim 1, wherein said parameter indicative of the energy of the candidate gesture along at least one axis depends on a variance of said signal.

5. The method according to claim 1, wherein said candidate gesture detection step further comprises a substep of testing if the value of the parameter indicative of the symmetry of the candidate gesture with respect to at least one axis is less than or equal to a first threshold and if the value of the parameter indicative of the energy of the candidate gesture along said axis is greater than or equal to a second threshold.

6. The method according to claim 5, wherein said candidate gesture detection step further includes a substep of testing if a value of a third parameter indicative of a dominant frequency of the signal along said axis is less than or equal to a third threshold.

7. The method according to claim 6, further including a step of automatic adaptation of at least one of said first, second, and third thresholds to the user.

8. The method according to claim 7, further including a step of modifying at least one of said first, second and third thresholds when a detected candidate gesture includes a corresponding parameter of a value not within a range of percentage values of said corresponding threshold.

9. The method according to claim 6, wherein at least one of said first, second, and third thresholds depends on an orientation of the mobile device.

10. The method according to claim 6, wherein said first, second, and third thresholds depend on the axis.

11. The method according to claim 1, further including a step of automatic adaptation of a size of the time window to durations of gestures in the set of predetermined gestures or to durations of the user's gestures.

12. The method according to claim 1, wherein said axis is a measurement axis of said sensor.

13. The method according to claim 1, wherein said substep of calculating the value of the parameter indicative of the energy of the candidate gesture along at least one axis is performed when said substep of calculating the value of the parameter indicative of the symmetry of the candidate gesture with respect to said axis indicates a symmetry.

14. The method according to claim 1, wherein said time window is a sliding window.

15. The method according to claim 14, further comprising a step of counting a number of successive time samples for which, over a corresponding time window, a candidate gesture is detected, and a step of comparing a detected candidate gesture with a set of predetermined gestures when said number of successive time samples reaches a predetermined number.

16. A recognition device for continuous recognition of gestures of a user of a handheld mobile device comprising a motion sensor assembly, and including at least a module configured to perform the method according to claim 1.

17. A handheld mobile device comprising a recognition device according to claim 16.

* * * * *